UNITED STATES PATENT OFFICE.

SWIGEL POSTERNAK, OF PARIS, FRANCE, ASSIGNOR TO THE FIRM OF SOCIETY OF CHEMICAL INDUSTRY IN BASLE, OF BASEL, SWITZERLAND.

NEW GLUCOSID AND PROCESS OF MAKING SAME.

959,027.  Specification of Letters Patent.  Patented May 24, 1910.

No Drawing.  Application filed August 19, 1908.  Serial No. 449,216.

*To all whom it may concern:*

Be it known that I, SWIGEL POSTERNAK, doctor of medicine and chemist, a subject of the Emperor of Russia, and resident of Paris, France, have discovered a new Glucosid and a Process for Making the Same, of which the following is a full, clear, and exact specification.

According to the present invention there may be obtained from the bark of *Rhamnus purshiana* a hitherto unknown glucosid in a pure form, by suitable treatment of the aqueous or alcoholic extract with basic lead acetate and ammonia, which glucosid has the properties of an excellently effective purgative. The process of isolating this new compound is illustrated by the following example.

Example: 40 parts by weight of coarsely pulverized bark of *Rhamnus purshiana* are extracted in a percolator with about 400 to 500 parts by weight of 90% alcohol. This alcoholic extract is cautiously concentrated, preferably *in vacuo*, and the syrupy residue stirred gradually with 200 parts by weight of water. The originally clear solution becomes clouded during the increase of the dilution and deposits finally a thick, viscous precipitate formed by emodin derivatives and inactive constituents of the bark. After filtration lead acetate and basic lead acetate are added to the filtrate as long as a precipitate is formed, for which about 4 parts by weight of lead acetate and 16 parts by weight of basic lead acetate (liq. plumb. subacetatis Ph. U. S.) are necessary. The precipitate is filtered off and thoroughly washed with water. The filtrate united with the wash waters contains the new glucosid soluble in water. In order to separate this glucosid, about 1 part by weight of basic lead acetate and about 4 parts by weight of 10% ammonia are added, whereby the lead salt of the glucosid is precipitated. The precipitate is isolated by filtration, well washed with water, suspended in water and treated with hydrogen sulfid to decompose the lead salt. The solution separated by filtration from the lead sulfid is finally evaporated cautiously to dryness *in vacuo* and the residue is purified by redissolving in alcohol. The glucosid thus obtained constitutes a yellowish powder having a less bitter taste than the extract from which it is derived. It is easily soluble in water or in glacial acetic acid to an orange yellow solution and only soluble with difficulty in cold absolute alcohol. In ether, petroleum ether and benzene it is insoluble. Its aqueous solution has an acid reaction (difference from xantho-rhamin) and when hot reduces Fehling's solution energetically.

The new glucosid cannot be precipitated from its aqueous solution by ordinary basic lead acetate and gives with Bornträger's test (executed according to the indications of Tschirch, *Ber. d. Deutsch. Pharm. Ges.* 1898, page 174) a colorless to straw-yellow ammonia solution (difference from the emodin glucosids: Frangulin, frangulic acid, pseudofrangulin). Concentrated sulfuric acid dissolves the product to a brown solution. When it is boiled with diluted sulfuric acid, sugar and a resin having a bitter taste are split off, the said resin being not an emodin derivative (difference from frangulin and other emodin glucosids) and being also not identical with rhamnetin. By heating the new glucosid alone, it is gradually decomposed; at about 120° a completely melted mass is obtained, which afterward becomes again viscous. When the compound is heated with zinc dust neither anthracene nor a volatile anthracene derivative is distilled off, a proof that the compound is not a derivative of anthracene.

The glucosid corresponds to the formula $C_{14}H_{18}O_8$. By several physiological and clinical experiments its purging effect has been ascertained with certainty. The active dose for an adult is 40–50 milligrams that is, 1/20 of the usual dose of the bark. Injected into the ear vein of a rabbit weighing 2 kilos this dose was without any poisonous effect.

What I claim is:

1. The described process for the manufacture of a new glucosid isolated from the bark of *Rhamnus purshiana*, consisting in first eliminating as far as possible the inactive substances from the liquid extracts of the bark by precipitation with lead acetate and basic lead acetate in neutral solution, then filtering and producing a precipitate in the filtrate by adding basic lead acetate and ammonia, then removing the lead from this second precipitate in the herein described manner and finally evaporating *in vacuo* the solution thus obtained.

2. The described process for the manufacture of a new glucosid isolated from the bark of *Rhamnus purshiana*, consisting in first eliminating as far as possible the inactive substances from the liquid extracts of the bark by precipitation with lead acetate and basic lead acetate in neutral solution, then filtering and producing a precipitate in the filtrate by adding basic lead acetate and ammonia, then removing the lead from this second precipitate in the herein described manner, evaporating *in vacuo* the solution thus obtained and finally purifying the remaining mass by recrystallization from alcohol.

3. As a new article of manufacture the described glucosid which can be extracted from the bark of *Rhamnus purshiana* and which forms a yellowish powder of the formula $C_{14}H_{18}O_8$, easily soluble in water and glacial acetic acid with a yellow color, insoluble in ether and benzene, difficultly soluble in cold absolute alcohol, not giving Bornträger's test and possessing the properties of a valuable purgative, the aqueous solution of the said glucosid showing an acid reaction, reducing Fehling's solution energetically, and being gradually decomposed on heating, a completely melted mass being obtained at 120° C. which afterward becomes again viscous.

In witness whereof I have hereunto signed my name this sixth day of August 1908, in the presence of two subscribing witnesses.

SWIGEL POSTERNAK.

Witnesses:
 HONORE MALET,
 AGNES Y. WELSH.